Oct. 23, 1956  M. SIMON ET AL  2,767,596
MECHANICAL ROTARY STEERING DEVICE FOR BOATS
Filed March 29, 1956  2 Sheets-Sheet 1

INVENTORS
MILTON SIMON
SIDNEY H. SIMON
BY
ATTORNEY

Oct. 23, 1956　　　M. SIMON, ET AL　　　2,767,596
MECHANICAL ROTARY STEERING DEVICE FOR BOATS
Filed March 29, 1956　　　　　　　　　2 Sheets-Sheet 2

INVENTORS
MILTON SIMON
SIDNEY H. SIMON
BY
Zoltan H. Polachek
ATTORNEY

United States Patent Office 2,767,596
Patented Oct. 23, 1956

2,767,596

MECHANICAL ROTARY STEERING DEVICE FOR BOATS

Milton Simon, Long Beach, and Sidney H. Simon, Oceanside, N. Y.

Application March 29, 1956, Serial No. 574,673

2 Claims. (Cl. 74—496)

This invention relates to new and useful improvements in boat steering devices.

More particularly, the present invention proposes the construction of an improved mechanical rotary steering device for boats which will permit rudder control and movement positively and efficiently by a steering wheel.

As a further object, the present invention proposes forming the rotary steering device with a housing having a ring gear rotatably mounted therein and a pinion mounted on a steering shaft and engaging the ring gear.

Still further, the present invention proposes constructing the device with a flexible steering cable connected to the ring gear and extending through the housing.

Another object of the invention proposes forming the disc housing with an inner circular groove and the ring gear with an outer circular groove slidably to receive the flexible steering cable.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 8 is a reduced bottom perspective view of the structure shown in Fig. 7.

Fig. 9 is a side view of the ring gear.

Fig. 10 is a fragmentary perspective view of the disc housing and rudder control cable and support sleeve and casing.

Figure 1:
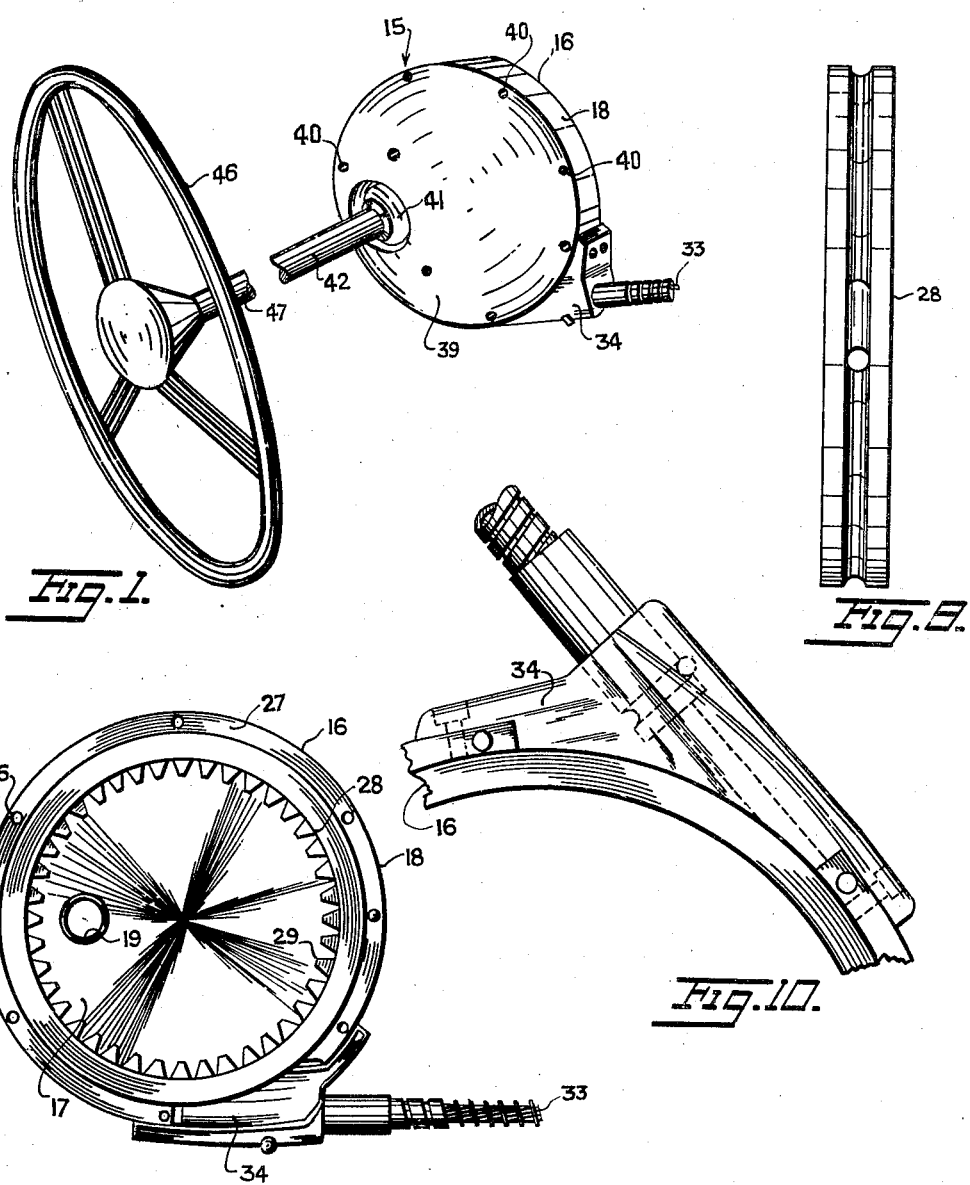
Fig. 1 is a perspective view of a steering wheel and a mechanical rotary steering device for boats constructed and arranged in accordance with the present invention.
Figure 2:
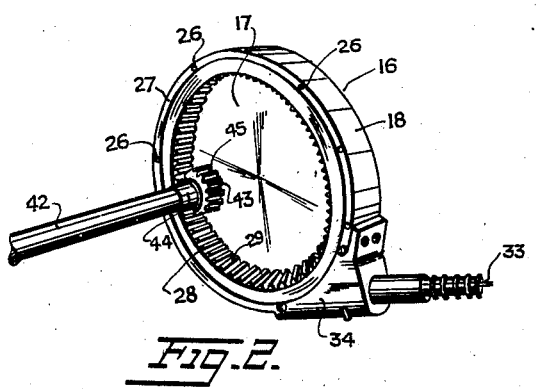
Fig. 2 is a view of the device similar to Fig. 1 but with the front cover plate removed.
Figure 5:
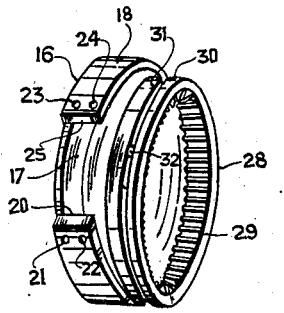
Fig. 5 is a view similar to Fig. 4 but showing the ring gear removed.
Figure 6:
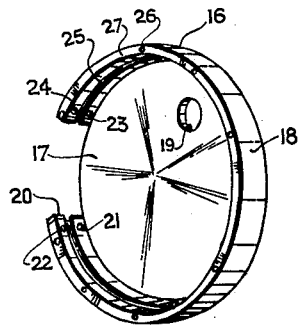
Fig. 6 is a perspective view of the disc housing.
Figure 4:
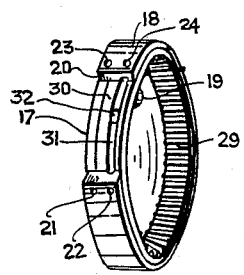
Fig. 4 is a perspective view of the disc housing and gear shown in Fig. 3.
Figure 3:
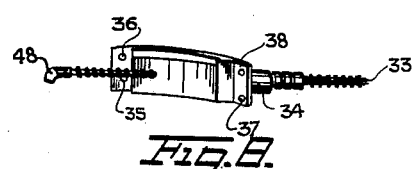
Fig. 3 is a front view of the structure shown in Fig. 2 but with the steering shaft and pinion omitted.
Figure 7:
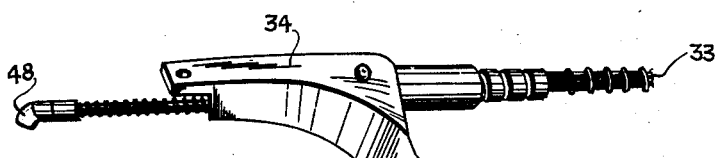
Fig. 7 is a side perspective view of the rudder control cable and support sleeve and casing.

Referring more particularly to the drawings the mechanical rotary steering device for boats is designated generally by the reference numeral 15.

Steering device 15 has a disc housing 16 with a rear wall 17 and a circular side wall 18. A shaft seating opening 19 is provided in the rear wall 17 adjacent the periphery of the housing and a peripheral rudder control cable opening 20 is provided in the circular side wall 18. Spaced screw openings 21, 22, 23 and 24 are formed in the side wall 18 adjacent the opening 20. Disc housing 16 has an inner circular groove 25 in the side wall 18 inside the housing. Front plate attaching screw openings 26 are also provided in the disc housing at the front 27 of the side wall 18.

A ring gear 28 is rotatably mounted in the disc housing 16. Ring gear 28 has internal teeth 29 and an exterior surface 30 with an outer circular groove 31 adapted to be disposed adjacent and complementary to the inner circular groove 25 in the disc housing 16 when the ring gear is in the housing 16. Ring gear 28 also has a rudder control cable and passage 32 disposed in the circular groove 31.

A flexible rudder control cable 33 is slidably mounted in a support sleeve and casing 34 having spaced screw openings 35, 36, 37 and 38 which fit over the screw openings 21, 22, 23 and 24 in the side wall 18 of the housing 16. The support sleeve and casing 34 fits over and covers the rudder control cable opening 20 in the side wall 18 of the disc housing 16 liquid tight.

Front plate 39 is removably secured liquid tight to the disc housing 16 by screws 40. Front plate 39 has a steering shaft bearing sleeve 41 and a steering shaft 42 rotatably fits in and extends through the sleeve 41. A pinion 43 is secured to the end 44 of the shaft 42 inside the housing 16. Pinion 43 has teeth 45 which mesh with the teeth 29 of the ring gear to turn the ring gear in the disc housing. The end 44 of shaft 42 is journaled in the opening 19 closing the opening liquid tight.

A steering wheel 46 is mounted on the other end 47 of the steering shaft 42. The flexible rudder control cable 33 has an end 48 which extends through the passage 32 in the ring gear and is secured to the ring gear. The flexible rudder control cable 33 also slidably extends through and between the opposed complementary circular grooves 25 and 31 of the housing and ring gear.

Movement of the steering wheel results in corresponding movement of the pinion and ring gear which in turn moves the rudder control cable.

While we have illustrated and described the preferred embodiment of our invention, it is to be understood that we do not limit ourselves to the precise construction herein disclosed and that various changes and modifications may be made within the scope of the invention as defined in the appended claims.

Having thus described our invention, what we claim as new, and desire to secure by United States Letters Patent is:

1. A mechanical rotary steering device for boats comprising a semi-annular disc housing open at its front end having an inner circular groove, a ring gear rotatably mounted in the disc housing, said ring gear having internal teeth and an exterior surface with an outer circular groove adapted to be disposed adjacent and complementary to the inner circular groove in the disc housing, a flexible rudder control cable having one end secured to the ring gear and adapted to fit loosely between and in the inner circular groove of the disc housing and the outer circular groove of the ring gear, a support sleeve and casing for the rudder control cable secured to and extending from the disc housing, a pinion, a rotatable steering shaft, said pinion being secured to the steering shaft and having teeth meshing with the internal teeth of the ring gear, and a front cover plate for the open end of the disc housing, said front cover plate having a steering shaft bearing sleeve and said steering shaft extending through said steering shaft bearing sleeve, said disc housing having a peripheral rudder control cable opening and said support sleeve and casing for the rudder control cable being removably secured to the disc housing over the rudder control cable opening, said disc housing having spaced screw openings adjacent the rudder control cable opening and said support sleeve and casing having corresponding aligned screw openings to match said screw openings in the disc housing, screws in said aligned openings, said ring gear having a rudder control cable end passage and said end of the rudder control cable extending through said rudder control cable end passage.

2. A mechanical rotary steering device for boats comprising a semi-annular disc housing open at its front end having an inner circular groove, a ring gear rotatably mounted in the disc housing, said ring gear having internal teeth and an exterior surface with an outer circular groove adapted to be disposed adjacent and complementary to the inner circular groove in the disc housing, a flexible rudder control cable having one end secured to the ring gear and adapted to fit loosely between and in the inner circular groove of the disc housing and the outer circular groove of the ring gear, a support sleeve and casing for the rudder control cable secured to and extending from the disc housing, a pinion a rotatable steering shaft, said pinion being secured to the steering shaft and having teeth meshing with the internal teeth of the ring gear, and a front cover plate for the open end of the disc housing, said front cover plate having a steering shaft bearing sleeve and said steering shaft extending through said steering shaft bearing sleeve, said disc housing having a peripheral rudder control cable opening and said support sleeve and casing for the rudder control cable being removably secured to the disc housing over the rudder control cable opening, said ring gear having a rudder control cable end passage and said end of the rudder control cable extending through said rudder control cable end passage, said disc housing and said front cover plate and support sleeve and casing forming an oil tight housing for the ring gear and pinion to run in a bath of oil.

References Cited in the file of this patent
UNITED STATES PATENTS

| | | |
|---|---|---|
| 1,076,870 | Dahl | Oct. 28, 1913 |

FOREIGN PATENTS

| | | |
|---|---|---|
| 715,907 | France | Oct. 5, 1931 |
| 437,765 | Italy | July 12, 1948 |